United States Patent
Paek et al.

(10) Patent No.: US 12,490,213 B2
(45) Date of Patent: Dec. 2, 2025

(54) METHOD FOR SYNCHRONIZE MULTIPLE SENSOR, AND COMPUTER PROGRAM RECORDED ON RECORD-MEDIUM FOR EXECUTING METHOD THEREFOR

(71) Applicant: MOBILTECH, Seoul (KR)

(72) Inventors: Seung Jin Paek, Gwangju-si (KR); Jae Seung Kim, Seoul (KR)

(73) Assignee: MOBILTECH, Seoul (KR)

( * ) Notice: Subject to any disclaimer, the term of this patent is extended or adjusted under 35 U.S.C. 154(b) by 321 days.

(21) Appl. No.: 18/339,336

(22) Filed: Jun. 22, 2023

(65) Prior Publication Data
US 2024/0147393 A1 May 2, 2024

(30) Foreign Application Priority Data
Oct. 27, 2022 (KR) .................. 10-2022-0139931

(51) Int. Cl.
  *H04W 56/00* (2009.01)
  *H04J 3/06* (2006.01)
  *H04L 5/00* (2006.01)

(52) U.S. Cl.
  CPC ....... *H04W 56/0015* (2013.01); *H04J 3/0661* (2013.01); *H04L 5/0051* (2013.01)

(58) Field of Classification Search
  CPC ............. H04W 56/0015; H04L 5/0051; H04L 7/0079; H04L 67/025; H04L 67/12; H04J 3/0661; H04Q 9/04; G06T 2207/10028; G01S 17/931; G01S 17/89; G01S 17/88; G01S 7/497; G01S 7/4972
  USPC ......... 702/217; 701/33.1; 382/103; 348/262; 356/5.01
  See application file for complete search history.

(56) References Cited

U.S. PATENT DOCUMENTS

| | | | |
|---|---|---|---|
| 10,531,075 B1* | 1/2020 | Dariush | G01S 17/931 |
| 2018/0107626 A1* | 4/2018 | Shao | G06F 13/4295 |
| 2019/0120946 A1* | 4/2019 | Wheeler | G06T 7/13 |
| 2020/0116502 A1* | 4/2020 | Xu | G01C 21/26 |
| 2020/0142073 A1* | 5/2020 | Gassend | G01S 17/10 |
| 2020/0408921 A1* | 12/2020 | Oh | G05D 1/0055 |
| 2023/0035972 A1* | 2/2023 | Agyeman | G01S 19/14 |

FOREIGN PATENT DOCUMENTS

| | | | |
|---|---|---|---|
| KR | 10-2016-0074106 A | | 6/2016 |
| KR | 10-2021-0001873 A | | 1/2021 |

* cited by examiner

*Primary Examiner* — Ricardo H Castaneyra
(74) *Attorney, Agent, or Firm* — Bridgeway IP Law Group, PLLC; Jihun Kim

(57) ABSTRACT

Proposed is a multi-sensor synchronization method for synchronizing operation timing and time of each of multiple sensors using signals received from Global Positioning Systems (GPSs). The method may include the steps of: receiving, by a synchronization device, a reference signal for synchronizing a plurality of sensors from a Global Positioning System (GPS) device; generating, by the synchronization device, a trigger signal for each of the plurality of sensors based on the reference signal; recording, by the synchronization device, a time stamp for the trigger signal on the basis of time information included in the reference signal; and transmitting, by the synchronization device, the trigger signal including the time information recorded in the time stamp to each of the plurality of sensors.

8 Claims, 11 Drawing Sheets

METHOD FOR SYNCHRONIZE MULTIPLE SENSOR, AND COMPUTER PROGRAM RECORDED ON RECORD-MEDIUM FOR EXECUTING METHOD THEREFOR

BACKGROUND OF THE INVENTION

Field of the Invention

The present invention relates to synchronization, more specifically, to a multi-sensor synchronization method for synchronizing a plurality of sensors and synchronizing time using signals received from Global Positioning Systems (GPSs), and a computer program recorded on a recording medium to execute the same.

Background of the Related Art

Autonomous driving of a vehicle means a system of a vehicle that can operate based on its own decision. The autonomous driving may be classified into progressive levels from non-automation to full-automation according to a degree of involvement of the system in driving and a degree of the driver in controlling the vehicle. Generally, the level of autonomous driving is divided into six levels classified by the Society of Automotive Engineers (SAE) International. According to the six levels classified by the Society of Automotive Engineers (SAE) International, level 0 is non-automation, level 1 is driver assistance, level 2 is partial automation, level 3 is conditional automation, level 4 is high-level automation, and level 5 is full automation.

Autonomous driving of a vehicle is performed through a mechanism of perception, localization, path planning, and control. Currently, several companies are developing to implement the perception and the path planning among the autonomous driving mechanism using artificial intelligence (AI). In addition, data used for machine learning of artificial intelligence (AI) that can be used for autonomous driving reaches a large number ranging from a few thousands to several millions.

The data used for machine learning of artificial intelligence (AI) that can be used for autonomous driving of a vehicle is collected by various types of sensors installed in the vehicle. For example, the data used for machine learning of artificial intelligence (AI) that can be used for autonomous driving of a vehicle may be data acquired, photographed, or sensed by LiDARs, cameras, radars, and ultrasonic sensors fixed to the vehicle, but it is not limited thereto.

However, since various sensors for acquiring, photographing, or measuring the data used for machine learning of artificial intelligence (AI) cannot be physically installed at the same place, and the sensors operate based on the time information of their own, there is a problem in that the sensors are not synchronized.

Accordingly, recently, the sensors are synchronized using a trigger board that generates a trigger signal for synchronizing a plurality of sensors.

However, since the conventional trigger board simply generates a trigger signal, a separate component is required to synchronize a plurality of sensors through the generated trigger signal, and there is a problem in that it is difficult to reduce the size due to the large volume, in addition to errors according to the latency generated in each part.

In addition, since the trigger signal does not include information on time, there is a problem in that an offset function for setting the initial time point of each of the plurality of sensors is separately required.

The present invention relates to a technique developed through the 'Urban change detection platform using mobility service' of Seoul Business Agency (2022 Seoul Innovation Challenge (final contest)) (IC210027).

In addition, the present invention is a technique developed through 'Task No. 22AMDP-C160637-02' of Korea Agency for Infrastructure Technology Advancement under the Ministry of Land, Infrastructure and Transport.

(Patent Document 0001) Korean Patent Publication No. 10-2016-0074106, 'Method for synchronizing sensor data', (published on Jun. 28, 2016)

SUMMARY OF THE INVENTION

Therefore, the present invention has been made in view of the above problems, and it is an object of the present invention to provide a multi-sensor synchronization method for synchronizing a plurality of sensors and synchronizing time using signals received from GPS devices.

Another object of the present invention is to provide a computer program recorded on a recording medium to execute a multi-sensor synchronization method for synchronizing a plurality of sensors and synchronizing time using signals received from GPS devices.

The technical problems of the present invention are not limited to the technical problems mentioned above, and unmentioned other technical problems will be clearly understood by those skilled in the art from the following description.

To accomplish the above objects, the present invention proposes a multi-sensor synchronization method for synchronizing operation timing and time of each of multiple sensors using signals received from Global Positioning Systems (GPSs). The method may include the steps of: receiving, by a synchronization device, a reference signal for synchronizing a plurality of sensors from a Global Positioning System (GPS) device; generating, by the synchronization device, a trigger signal for each of the plurality of sensors based on the reference signal; recording, by the synchronization device, a time stamp for the trigger signal on the basis of time information included in the reference signal; and transmitting, by the synchronization device, the trigger signal including the time information recorded in the time stamp to each of the plurality of sensors.

Specifically, the reference signal includes a GPS pulse per second (PPS) signal and a GPS GPRMC signal, and the step of generating a trigger signal includes generating a trigger signal corresponding to each of the plurality of sensors by dividing the GPS PPS signal by a preset number of times according to types of the plurality of sensors, and the step of recording a time stamp includes recording a time stamp for the trigger signal on the basis of time information included in the GPS GPRMC signal.

The step of receiving a reference signal includes generating, by the synchronization device, the PPS signal and the GPRMC signal on the basis of local time when the reference signal is not received.

The plurality of sensors includes at least one among a LiDAR, a camera, an encoder, a radar, a temperature sensor, and a humidity sensor.

The step of transmitting the trigger signal, includes transmitting the reference signal to the LiDAR so that the LiDAR may control a rotation angle in accordance with the reference signal, and transmitting the trigger signal to the camera so that the camera may control shutter timing in accordance with the trigger signal.

The multi-sensor synchronization method further comprises, before the step of transmitting the trigger signal, the steps of: acquiring, by the synchronization device, a sample indicating a current position at every preset output period from the LiDAR; and deriving, by the synchronization device, trigger timing, which is an expected time for the LiDAR to rotate from the current position to a trigger target, on the basis of the sample.

The step of transmitting the trigger signal includes transmitting the trigger signal to the camera after a time indicated by the trigger timing elapses.

The sample includes a rotation angle indicating the current position of the LiDAR, the trigger target is a virtual direction in which a center of an angle of view of the LiDAR is in line with that of the camera, and the rotation angle is an angle that the LiDAR rotates with respect to the trigger target.

The step of deriving trigger timing includes the steps of: deriving, by the synchronization device, an average value by dividing a total sum of a value of difference between the rotation angle included in the acquired sample and the rotation angle included in the previously acquired sample by the accumulated number of acquired samples; repeating, by the synchronization device, the step of acquiring the sample when the number of acquired samples is smaller than a predetermined target number of samples; and deriving the trigger timing on the basis of the average value when the number of acquired samples is equal to the target number of samples.

The step of deriving trigger timing on the basis of the average value includes the steps of: deriving, by the synchronization device, a value obtained by dividing the average value by the output period as an average angular velocity; acquiring, by the synchronization device, a gap angle, which is an angular difference between a rotation angle included in a most recently acquired sample and the trigger target; and deriving, by the synchronization device, a value obtained by dividing the gap angle by the average angular velocity as the trigger timing.

At the step of transmitting the trigger signal, the trigger signal is transmitted to a vehicle equipped with the LiDAR to synchronize time information of Controller Area Network (CAN) communication, which is a communication standard between devices installed in the vehicle, through the trigger signal.

At the step of recording a time stamp, when an event signal is input, the time point of receiving the event signal is recorded in the time stamp.

To accomplish the above objects, the present invention proposes a computer program recorded on a recording medium to execute the synchronization method as described above. The computer program may be combined with a computing device including a memory, a transceiver, and a processor for processing instructions loaded on the memory. In addition, the computer program may be a computer program recorded on a recording medium to execute the steps of: receiving, by the processor, a reference signal for multi-sensor synchronization from a Global Positioning System (GPS) device; generating, by the processor, a trigger signal for each of at least one sensor on the basis of the reference signal; recording, by the processor, a time stamp for the trigger signal on the basis of time information included in the reference signal; and transmitting, by the processor, the trigger signal including the time information recorded in the time stamp to each of the plurality of sensors.

Details of other embodiments are included in the detailed description and drawings.

According to the embodiments of the present invention, as a trigger signal suitable for each sensor is generated based on the GPS PPS signal and the GPS GPRMC signal provided by GPS devices, and the generated trigger signal is transmitted to each sensor to synchronize time information, reliability of data collected from each sensor can be secured.

The effects of the present invention are not limited to the effects mentioned above, and unmentioned other effects will be clearly understood by those skilled in the art from the following description.

DETAILED DESCRIPTION OF THE PREFERRED EMBODIMENT

Figure 1:
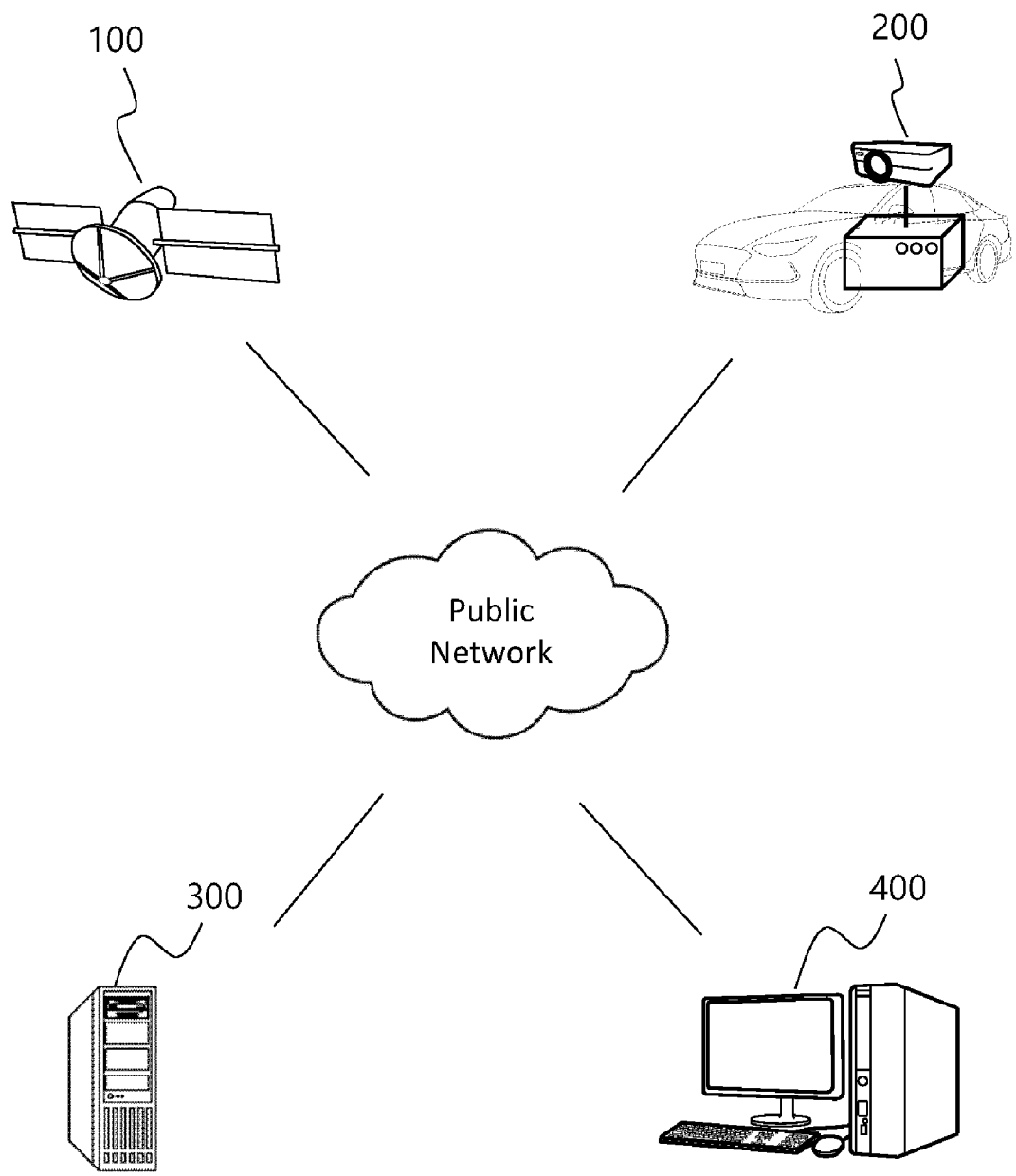
FIG. 1 is a view showing the configuration of a multi-sensor synchronization system according to an embodiment of the present invention.

It should be noted that the technical terms used in this specification are only used to describe specific embodiments and are not intended to limit the present invention. In addition, the technical terms used in this specification should be interpreted as a meaning commonly understood by those of skilled in the art, unless specifically defined otherwise in this specification, and should not be interpreted in an excessively inclusive or reduced meaning. In addition, when the technical terms used in this specification are incorrect technical terms that do not accurately express the spirit of the present invention, they should be replaced with technical terms that those skilled in the art can correctly understand. In addition, general terms used in the present invention should be interpreted as defined in a dictionary or according to the context, and should not be interpreted in an excessively reduced meaning.

In addition, singular expressions used in this specification include plural expressions unless the context clearly indicates otherwise. In this application, terms such as 'configured of' or 'having' should not be interpreted as necessarily including all of the various components or steps described in the specification, and should be interpreted as including some of the components or steps among them, or further including additional components or steps.

In addition, although the terms including ordinal numbers such as first, second, and the like used in this specification may be used to describe various components, the components should not be limited by the terms. The terms are used only for the purpose of distinguishing one component from another. For example, a first component may be named as a second component without departing from the scope of the present invention, and similarly, a second component may also be named as a first component.

When a component is referred to as being 'connected' or 'coupled' to another component, although it may be directly connected or coupled to another component, other components may exist between the components. On the contrary, when a component is referred to as being 'directly connected' or 'directly coupled' to another component, it should be understood that no other component exists therebetween.

Hereinafter, preferred embodiments according to the present invention will be described in detail with reference to the accompanying drawings, and the same or similar components are given the same reference numerals regardless of drawing symbols, and redundant description thereof will be omitted. In addition, when it is determined in describing the present invention that a detailed description of a related known technology may obscure the gist of the present invention, the detailed description will be omitted. In addition, it should be noted that the accompanying drawings are only for easy understanding of the spirit of the present invention, and it should not be construed as limiting the spirit of the present invention by the accompanying drawings. The spirit of the present invention should be interpreted as extending to all changes, equivalents, and substitutes, in addition to the accompanying drawings.

Meanwhile, since various sensors for acquiring, photographing, or measuring the data used for machine learning of artificial intelligence (AI) cannot be physically installed at the same place, and the sensors operate based on the time information of their own, there is a problem in that the sensors are not synchronized.

Accordingly, recently, the sensors are synchronized using a trigger board that generates a trigger signal for synchronizing a plurality of sensors.

However, since the conventional trigger board simply generates a trigger signal, a separate component is required to synchronize a plurality of sensors through the generated trigger signal, and there is a problem in that it is difficult to reduce the size due to the large volume, in addition to errors according to the latency generated in each part.

In addition, since the conventional trigger board does not have information on time, there is a problem in that an offset function for setting the initial time point is separately required.

To overcome these limitations, the present invention proposes various means capable of synchronizing operation timing and time of each of multiple sensors using signals received from Global Positioning Systems (GPSs).

FIG. 1 is a view showing the configuration of a multi-sensor synchronization system according to an embodiment of the present invention.

Referring to FIG. 1, a multi-sensor synchronization system 500 according to an embodiment of the present invention may be configured to include a GPS device 100, a learning data collection device 200, a synchronization device 300, and a learning data generation device 400.

Since the components of the multi-sensor synchronization system 500 according to an embodiment are only functionally distinguished components, two or more components may be implemented to be integrated in an actual physical environment, or one component may be implemented to be separated in an actual physical environment.

Describing each component, the GPS device 100 may generate and provide a reference signal that can be used as a reference to the synchronization device 300 for the sake of synchronization between a plurality of sensors included in the learning data collection device 200 and synchronization of time.

Specifically, the GPS device 100 may provide a reference signal including a GPS Pulse Per Second (PPS) signal and a GPS GPRMC signal to the synchronization device 300.

Here, the GPS PPS signal is one of data provided by the GPS device 100 and is a pulse generated every second, and although the precision may vary according to performance of a GPS receiver receiving the GPS signal, the GPS PPS signal generally has a precision of hundreds of nanoseconds.

The GPS GPRMC is also referred to as 'Recommended Minimum Data', and is minimum data provided from the GPS device 100, and may include information such as time, latitude, longitude, and the like.

As a next configuration, the learning data collection device 200 is a device that can be used to collect data for machine learning of artificial intelligence (AI) that can be used for autonomous driving of a vehicle.

For this purpose, the learning data collection device 200 may be configured to include one or more among a LiDAR, a camera, a radar, an ultrasonic sensor, an encoder, a temperature sensor, and a humidity sensor. The learning data collection device 200 is not limited thereto, and may be a computing device that collects data measured by one or more LiDARs, cameras, radars, ultrasonic sensors, encoders, temperature sensors, and humidity sensors.

The detailed structure of the learning data collection device 200 will be described below with reference to FIG. 2.

As a next configuration, the synchronization device 300 is a device that can be used for synchronization of a plurality of sensors included in the learning data collection device 200.

Characteristically, the synchronization device 300 may receive a reference signal for synchronizing a plurality of sensors from the GPS device 100 and generate a trigger signal for each of the plurality of sensors on the basis of the reference signal.

In addition, the synchronization device 300 may record a time stamp for a trigger signal on the basis of time information included in the reference signal, and transmit the trigger signal including the time information recorded in the time stamp to each of a plurality of sensors.

Any device capable of transmitting and receiving data to and from the GPS device 100, the learning data collection device 200, and the learning data generation device 400, and performing operation based on the transmitted and received data may be accepted as the synchronization device 300 having such characteristics. For example, the synchronization device 300 may be any one of fixed-type computing devices such as a desktop, a workstation, and a server, but it is not limited thereto.

Meanwhile, a detailed description of the synchronization device 300 will be provided below with reference to FIGS. 3 and 4.

As a next configuration, the learning data generation device 400 is a device that can be used to design and generate data for machine learning of artificial intelligence (AI) that can be used for autonomous driving of a vehicle.

The learning data generation device 400 may receive data collected from a plurality of sensors included in the learning data collection device 200. For example, the learning data generation device 400 may receive 3D point cloud data generated by a LiDAR, images generated by a camera, and the like.

In addition, the learning data generation device 400 may receive a time stamp generated by the synchronization device 300.

Through this, the learning data generation device 400 may synchronize and process the data collected from the learning data collection device 200 based on the time stamp recorded by the synchronization device 300 to be processed as learning data for machine learning of artificial intelligence.

In addition, any device capable of transmitting and receiving data to and from the GPS device 100, the learning data collection device 200, and the synchronization device 300, and performing operation based on the transmitted and received data may be accepted as the learning data generation device 400. For example, the synchronization device 300 may be any one of fixed-type computing devices such as a desktop, a workstation, and a server, but it is not limited thereto.

The GPS device 100, the learning data collection device 200, the synchronization device 300, and the learning data generation device 400 as described above may transmit and receive data using a network combining one or more among a security circuit, a public wired communication network, and a mobile communication network directly connecting the devices.

For example, the public wired communication network may include Ethernet, x Digital Subscriber Line (xDSL), Hybrid Fiber Coax (HFC), and Fiber-To-The-Home (FTTH), but it is not limited thereto. In addition, the mobile communication network may include Code Division Multiple Access (CDMA), Wideband CDMA (WCDMA), High Speed Packet Access (HSPA), Long Term Evolution (LTE), and 5th generation mobile telecommunication, but it is not limited thereto.

Hereinafter, the learning data collection device 200 as described above will be described in detail.

Figure 2:
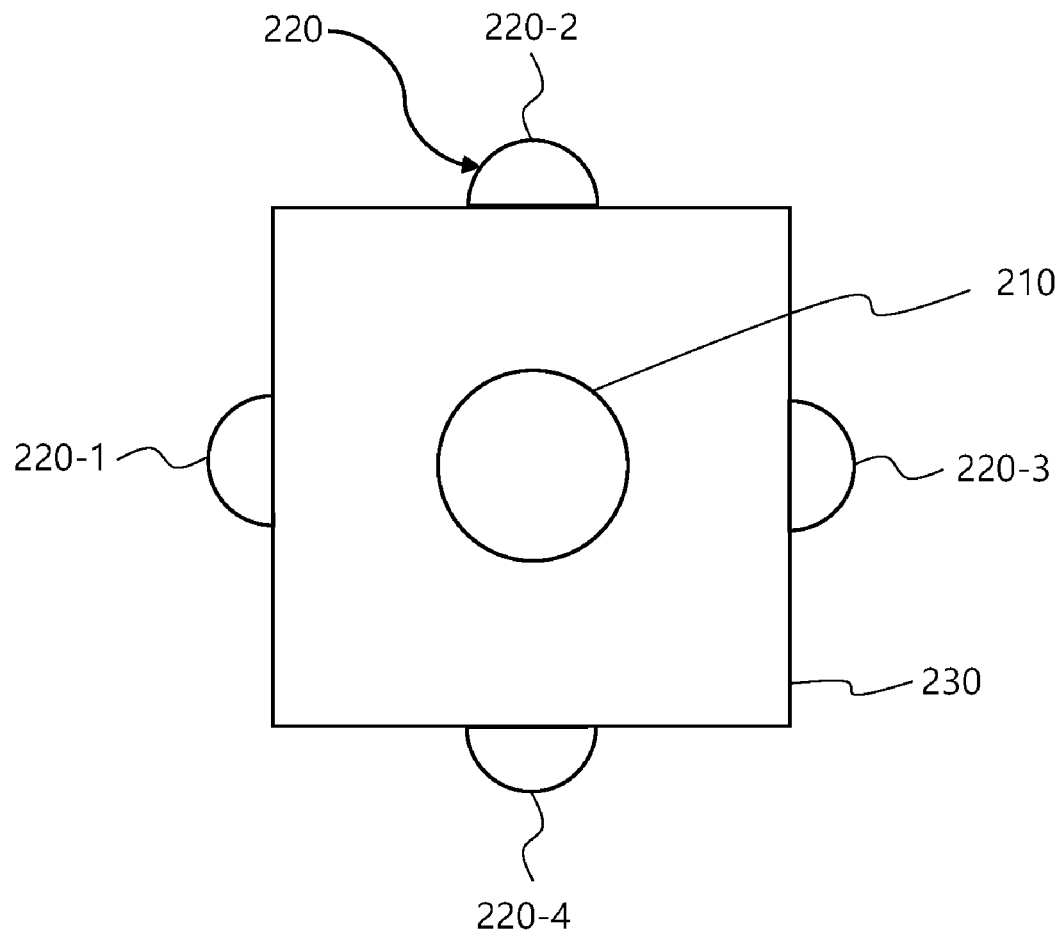
FIG. 2 is an exemplary view showing a coupling state of multiple sensors according to an embodiment of the present invention.

FIG. 2 is an exemplary view showing a coupling state of multiple sensors according to an embodiment of the present invention.

Referring to FIG. 2, the learning data collection device 200 according to an embodiment of the present invention may be configured to include a LiDAR 210 and a camera 220 (220-1, 220-2, 220-3, and 220-4).

Meanwhile, the learning data collection device 200 is described as being configured of a LiDAR 210 and cameras 220 in the following description, but it is not limited thereto, and may be configured of a combination of various sensors such as a radar, an ultrasonic sensor, a temperature sensor, a humidity sensor, and the like.

The LiDAR 210 may be fixedly installed in a main body 230 to emit laser pulses around the main body 230, detect light reflected and returned from objects located around the vehicle, and generate 3D point cloud data corresponding to a three-dimensional image of around the vehicle. For example, the LiDAR 210 may be disposed on the top surface of the main body 230 formed in a hexahedron. Accordingly, the 3D point cloud data acquired by the LiDAR 210 may include a set of points that reflect the laser pulses emitted into a three-dimensional space by the LiDAR 210.

The cameras 220 may acquire images of a space collected from the LiDAR 210 around the LiDAR 210. For example, the cameras 220 may be disposed on the side surfaces of the main body 230 in a radial shape around the LiDAR 210. Although four cameras 220 are shown to be disposed on each side surface of the main body 230 for convenience of explanation, it will be apparent to those skilled in the art that the present invention may be implemented with fewer than or more than four cameras. The cameras 200 may include any one among a color camera, a near infrared (NIR) camera, a short wavelength infrared (SWIR) camera, and a long wave length infrared (LWIR) camera.

Hereinafter, a detailed configuration of a synchronization device according to an embodiment of the present invention will be described.

Figure 3:
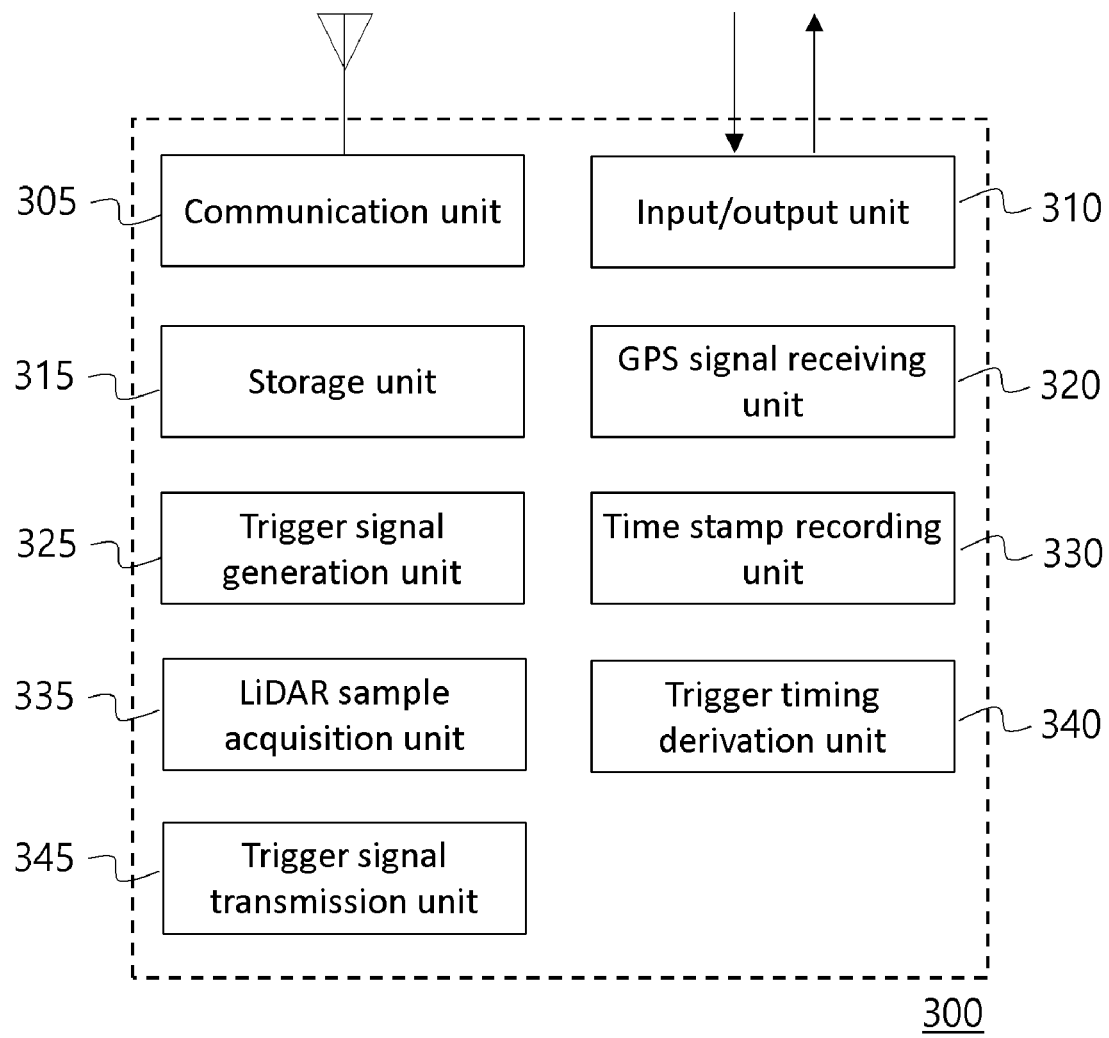
FIG. 3 is a block diagram showing the logical configuration of a synchronization device according to an embodiment of the present invention.

FIG. 3 is a block diagram showing the logical configuration of a synchronization device according to an embodiment of the present invention.

As shown in FIG. 3, the synchronization device 300 may be configured to include a communication unit 305, an input/output unit 310, a storage unit 315, a GPS signal receiving unit 320, a trigger signal generation unit 325, a time stamp recording unit 330, a LiDAR sample acquisition unit 335, a trigger timing derivation unit 340, and a trigger signal transmission unit 345.

Since the components of the synchronization device 300 are only functionally distinguished components, two or more components may be implemented to be integrated in an actual physical environment, or one component may be implemented to be separated in an actual physical environment.

Describing each component, the communication unit 305 may transmit and receive data to and from one or more among the GPS device 100, the learning data collection device 200, and the learning data generation device 400.

Specifically, the communication unit 305 may receive a reference signal from the GPS device 100. That is, the communication unit 305 may receive a GPS PPS signal and a GPR GPRMC signal from the GPS device 100. In addition, the communication unit 305 may transmit a reference signal or a trigger signal to the learning data collection device 200. Here, the reference signal or the trigger signal may include time information. In addition, the communication unit 305 may receive samples from the learning data collection device 200. In addition, the communication unit 305 may transmit a time stamp to the learning data generation device 400.

As a next configuration, the input/output unit 310 may receive a signal from a user through a user interface (UI) or output an operation result to the outside. Specifically, the input/output unit 310 may receive a setting signal for generating a trigger signal, a setting signal for generating a time stamp, and the like from a user.

As a next configuration, the storage unit 315 may store the GPS PPS signal and the GPS GPRMC signal received from the GPS. In addition, the storage unit 315 may store time stamps for the reference signal and the trigger signal.

As a next configuration, the GPS signal receiving unit 320 may control to receive a reference signal for synchronizing a plurality of sensors included in the learning data collection device 200 and synchronizing time from the GPS device 100 through the communication unit 305.

Here, the reference signal may include a GPS Pulse Per Second (PPS) signal and a GPS GPRMC signal. Here, the GPS PPS signal is one of data provided by the GPS device 100 and is a pulse generated every second, and although the precision may vary according to performance of a GPS receiver receiving the GPS signal, the GPS PPS signal generally has a precision of hundreds of nanoseconds. The GPS GPRMC is also referred to as 'Recommended Minimum Data', and is minimum data provided from the GPS device 100, and may include information such as time, latitude, longitude, and the like.

In addition, when the reference signal is not received from the GPS device 100, the GPS signal receiving unit 320 may generate a PPS signal and a GPRMC signal on the basis of the local time. That is, the GPS signal receiving unit 320 may generate a PPS signal having a pulse of 1 Hz on the basis of a physically connected device having time information. In addition, the GPS signal receiving unit 320 may record time information in a time stamp on the basis of the time information of the physically connected device.

As a next configuration, the trigger signal generation unit 325 may generate a trigger signal for each of a plurality of sensors on the basis of the reference signal received through the GPS signal receiving unit 320.

Specifically, the trigger signal generation unit 325 may generate a trigger signal corresponding to each of a plurality of sensors by dividing the GPS PPS signal by a predetermined number of times according to the types of the plurality of sensors.

For example, the trigger signal generation unit 325 may generate a trigger signal of 1 Hz the same as the GPS PPS signal in the case of a LiDAR, a trigger signal of 10 Hz by dividing the GPS PPS signal into 10 segments in the case of a camera, a trigger signal of 20 Hz by dividing the GPS PPS signal into 20 segments in the case of an encoder, a trigger signal of 10 Hz by dividing the GPS PPS signal into 10 segments in the case of a radar, a trigger signal of 10 Hz by dividing the GPS PPS signal into 10 segments in the case of CAN communication of a vehicle, and a trigger signal of 5 Hz by dividing the GPS PPS signal into 5 segments in the case of a temperature sensor and a humidity sensor.

As a next configuration, the time stamp recording unit 330 may record a time stamp for the trigger signal generated by the trigger signal generation unit 325 on the basis of time information included in the reference signal, and store the time stamp in the storage unit 315.

Specifically, the time stamp recording unit 330 may record a time stamp for a trigger signal on the basis of time information included in the GPS GPRMC signal. For example, the time stamp recording unit 330 may generate a time stamp displaying the pulse waveform of the trigger signal of each sensor on the time axis.

In addition, when an event signal is input, the time stamp recording unit 330 may record the time point of receiving the event signal in the time stamp. For example, the event signal may be a switch signal input by a passenger riding in a vehicle equipped with the learning data collection device 200 when a specific event occurs, a signal generated when a specific object is detected in the 3D point cloud data collected from the LiDAR, a signal generated when a specific object is detected in the image collected from the camera, and the like. In this way, the generated time stamp may generate learning data by selectively collecting data corresponding to an event signal suitable for the purpose of the learning data to be generated in the course of generating the learning data by the learning data generation device 400.

As a next configuration, the LiDAR sample acquisition unit 335 may acquire samples output from the LiDAR of the learning data collection device 200, store the rotation angle included in the acquired samples in the internal storage unit 315, and update an acquired sample count indicating the number of acquired samples. That is, the LiDAR sample acquisition unit 335 may increase the value of the acquired sample count by 1 whenever a new sample is acquired.

In addition, the LiDAR sample acquisition unit 335 may derive an average value by dividing the total sum of a value of difference between the rotation angle included in the acquired sample and the rotation angle included in the previously acquired sample by the acquired sample count.

In addition, the LiDAR sample acquisition unit 335 may repeatedly perform acquisition of samples when the acquired sample count is smaller than a predetermined target sample count N.

Here, the target sample count N may be determined according to the specifications of the LiDAR 100. That is, the target sample count N may be determined by the number of rotations per second and the output period $T_{reload}$ of the LiDAR. Specifically, the target sample count N may be an integer part of a value obtained by dividing an angular difference between trigger targets by a product of an angular velocity and the output period $T_{reload}$.

For example, when the number of rotations per second is 10, it means a rotation of 3600 degrees per second, and the angular velocity is 3600/s. In addition, when the output period $T_{reload}$ is 0.01 seconds, it rotates and moves as much as 36 degrees calculated by multiplying 3600 degrees by 0.01 seconds in one output period $T_{reload}$, and when there is only one trigger target, the angular difference between the trigger targets is 360 degrees, and the target sample count N may be 10, which is a value obtained by dividing 360 degrees by 36 degrees. When there is a plurality of trigger targets, a value obtained by dividing the angle between the trigger targets by 36 degrees obtained above may be the target sample count N.

Meanwhile, the sample may include a rotation angle indicating the current position of the LiDAR. In addition, the trigger target may mean a virtual direction in which the center of the angle of view of the LiDAR is in line with that of the camera. In addition, the rotation angle may mean an angle that the LiDAR rotates with respect to the trigger target.

As a next configuration, the trigger timing derivation unit 340 may derive a value obtained by dividing the average value by the output period $T_{reload}$ as an average angular velocity when the acquired sample count is equal to the target sample count N.

Figure 10:
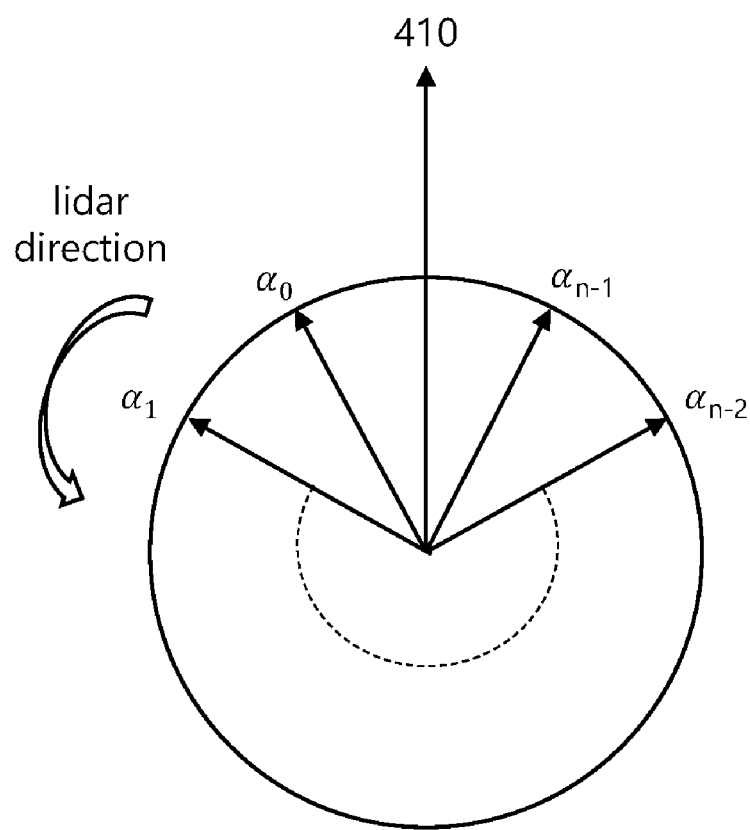

In addition, the trigger timing derivation unit 340 may acquire a gap angle, which is an angular difference between a point at which the LiDAR outputs a sample most recently and a trigger target. Referring to FIG. 10, the gap angle is an angular difference between $a_{n-1}$ and the trigger target 410.

As a next configuration, the trigger signal transmission unit 345 may transmit a trigger signal including time information recorded through the time stamp recording unit 330 to each of a plurality of sensors.

Specifically, the trigger signal transmission unit 345 may transmit the reference signal to the LiDAR so that the LiDAR may control the rotation angle in accordance with the reference signal, and transmit the trigger signal to the camera so that the camera may control the shutter timing in accordance with the trigger signal.

At this point, the trigger signal transmission unit 345 may transmit the trigger signal for the camera generated by the trigger signal generation unit 325 to the camera when the time of the trigger timing derived by the trigger timing derivation unit 340 elapses.

In addition, the trigger signal transmission unit 345 may transmit a trigger signal to a vehicle equipped with the LiDAR to synchronize time information of Controller Area Network (CAN) communication, which is a communication standard between devices installed in the vehicle, through the trigger signal.

Hereinafter, hardware for implementing the logical components of the synchronization device 300 according to an embodiment of the present invention as described above will be described in more detail.

Figure 4:
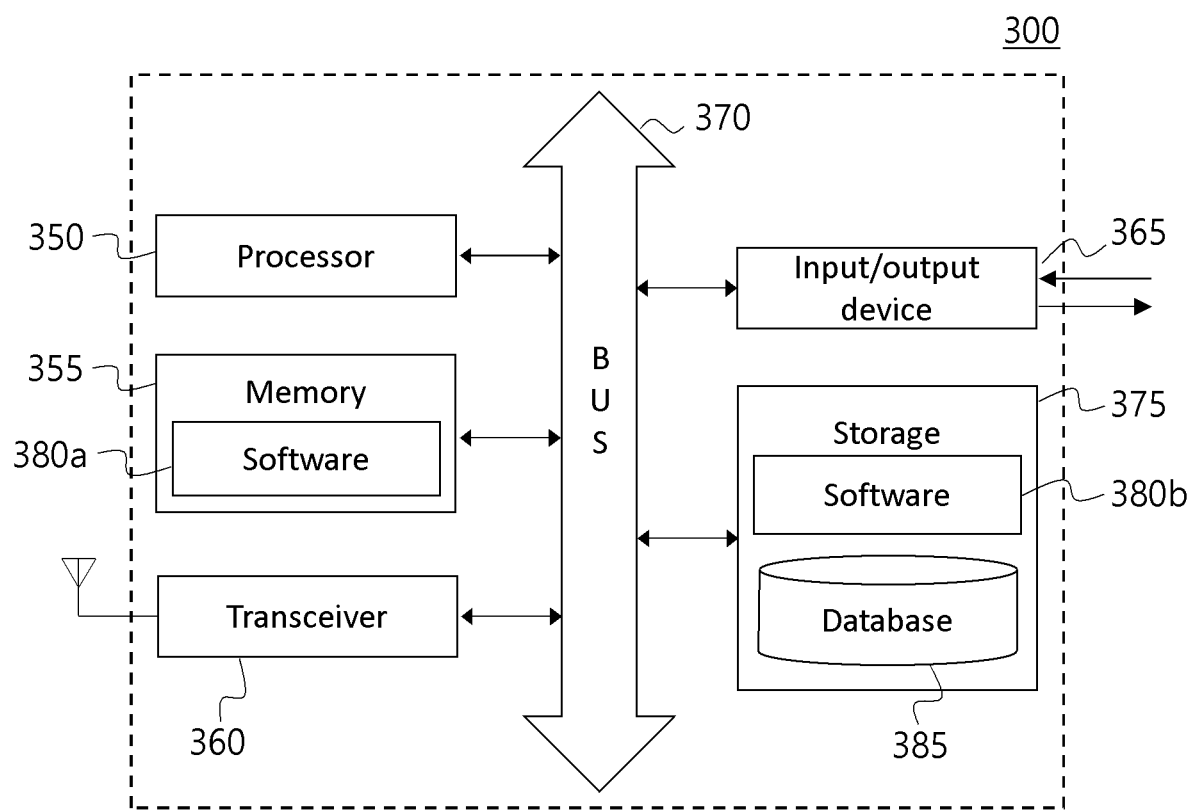
FIG. 4 is a block diagram showing the hardware configuration of a synchronization device according to an embodiment of the present invention.

FIG. 4 is a block diagram showing the hardware configuration of a synchronization device according to an embodiment of the present invention.

As shown in FIG. 4, the synchronization device 300 may be configured to include a processor 350, a memory 355, a transceiver 360, an input/output device 365, a data bus 370, and a storage 375.

The processor 350 may implement operations and functions of the synchronization device 300 on the basis of instructions according to the software 380a that implements the method according to the embodiments of the present invention loaded on the memory 355. The software 380a implementing the method according to the embodiments of the present invention may be loaded on the memory 355. The transceiver 360 may transmit and receive data to and from the GPS device 100, the learning data collection device 200, and the learning data generation device 400. The input/output device 365 may receive data needed for the functional operation of the synchronization device 300 and output a generated time stamp and the like. The data bus 370 is connected to the processor 350, the memory 355, the transceiver 360, the input/output device 365, and the storage 375 to perform a function of a movement path for transferring data between the components.

The storage 375 may store application programming interfaces (API), library files, resource files, and the like needed for execution of the software 380a in which the method according to the embodiments of the present invention is implemented. The storage 375 may store software 380b in which the method according to the embodiments of the present invention is implemented. In addition, the storage 375 may store information needed for performing the method according to the embodiments of the present invention.

According to an embodiment of the present invention, the software 380a and 380b for implementing a method of automatically specifying an object, which is loaded on the memory 355 or stored in the storage 375, may be a computer program recorded on a recording medium to execute the steps of: receiving, by the processor 350, a reference signal for multi-sensor synchronization from a Global Positioning System (GPS) device; generating, by the processor 350, a trigger signal for each of at least one sensor on the basis of the reference signal; recording, by the processor 350, a time stamp for the trigger signal on the basis of time information included in the reference signal; and transmitting, by the processor 350, the trigger signal including the time information recorded in the time stamp to each of the plurality of sensors.

More specifically, the processor 350 may include an Application-Specific Integrated Circuit (ASIC), another chipset, a logic circuit, and/or a data processing device. The memory 355 may include read-only memory (ROM), random access memory (RAM), flash memory, a memory card, a storage medium, and/or other storage devices. The transceiver 360 may include a baseband circuit for processing wired/wireless signals. The input/output device 365 may include an input device such as a keyboard, a mouse, and/or a joystick, an image output device such as a Liquid Crystal Display (LCD), an Organic LED (OLED), and/or an active matrix OLED (AMOLED), and a printing device such as a printer, a plotter, or the like.

When the embodiments included in this specification are implemented as software, the method described above may be implemented as a module (process, function, or the like) that performs the functions described above. The module may be loaded on the memory 355 and executed by the processor 350. The memory 355 may be inside or outside the processor 350 and connected to the processor 350 by various well-known means.

Each component shown in FIG. 4 may be implemented by various means, for example, hardware, firmware, software, or a combination thereof. When the component is implemented as hardware, an embodiment of the present invention may be implemented as one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In addition, when the component is implemented as firmware or software, an embodiment of the present invention may be implemented in the form of a module, procedure, function, or the like that performs the functions or operations described above, and recorded on a recording medium that can be read through various computer means. Here, the recording medium may include program commands, data files, data structures, and the like individually or in combination. Program instructions recorded on a recording medium may be instructions specially designed and configured for the present invention or those known to and used by those skilled in computer software. For example, the recording medium includes magnetic media such as hard disks, floppy disks, and magnetic tapes, optical media such as Compact Disk Read Only Memory (CD-ROMs) and Digital Video Disks (DVDs), magneto-optical media such as floptical disks, and hardware devices specially configured to store and execute program instructions, such as ROM, RAM, flash memory, and the like. Examples of the program instructions may include high-level language codes that can be executed by a computer using an interpreter or the like, as well as machine language codes generated by a compiler. These hardware devices may be configured to operate as one or more pieces of software to perform the operations of the present invention, and vice versa.

Hereinafter, a synchronization method according to an embodiment of the present invention will be described in detail.

Figure 5:
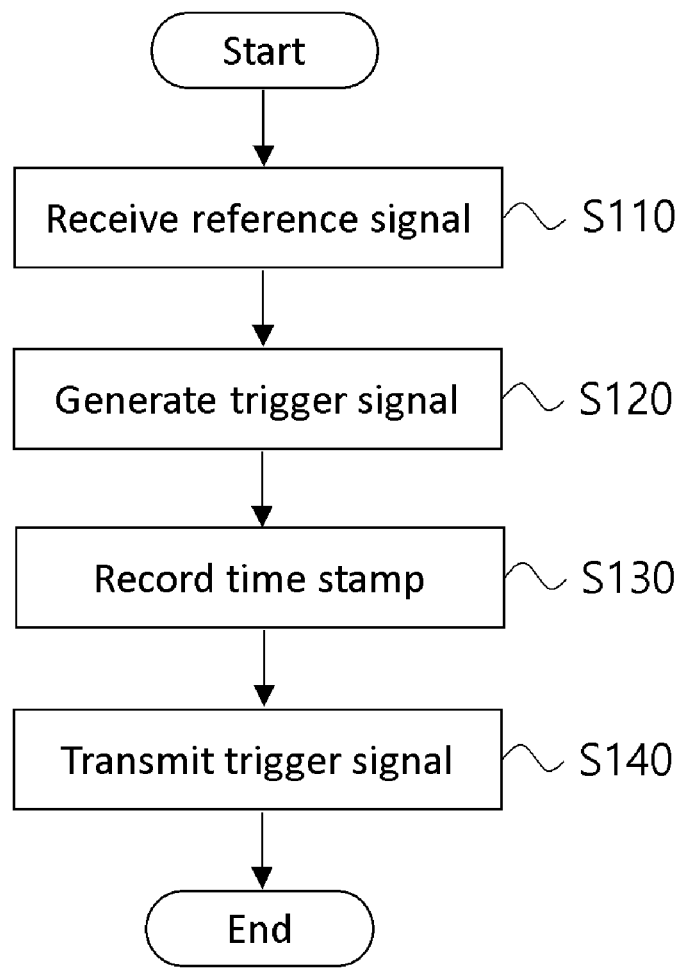
FIG. 5 is a flowchart illustrating a synchronization method according to an embodiment of the present invention.

FIG. 5 is a flowchart illustrating a synchronization method according to an embodiment of the present invention.

As shown in FIG. 5, at step S110, the synchronization device may receive a reference signal for synchronizing a plurality of sensors included in the learning data collection device from the GPS device.

Here, when the reference signal is not received from the GPS device, the synchronization device may generate a PPS signal and a GPRMC signal on the basis of the local time. That is, the synchronization device may generate a PPS signal that generates a pulse every one second on the basis of a physically connected device having time information. In addition, the synchronization device may record time information in a time stamp on the basis of the time information of the physically connected device.

Next, at step S120, the synchronization device may generate a trigger signal for each of a plurality of sensors on the basis of the reference signal received from the GPS device.

Specifically, the synchronization device may generate a trigger signal corresponding to each of a plurality of sensors by dividing the GPS PPS signal by a predetermined number of times according to the types of the plurality of sensors.

For example, the synchronization device may generate a trigger signal of 1 Hz the same as the GPS PPS signal in the case of a LiDAR, a trigger signal of 10 Hz by dividing the GPS PPS signal into 10 segments in the case of a camera, a trigger signal of 20 Hz by dividing the GPS PPS signal into 20 segments in the case of an encoder, a trigger signal of 10 Hz by dividing the GPS PPS signal into 10 segments in the case of a radar, a trigger signal of 10 Hz by dividing the GPS PPS signal into 10 segments in the case of CAN communication of a vehicle, and a trigger signal of 5 Hz by dividing the GPS PPS signal into 5 segments in the case of a temperature sensor and a humidity sensor.

Next, at step S130, the synchronization device may record and store a time stamp for the trigger signal generated at step S120 on the basis of time information included in the reference signal.

Specifically, the synchronization device may record a time stamp for a trigger signal on the basis of time information included in the GPS GPRMC signal. For example, the synchronization device may generate a time stamp displaying the pulse waveform of the trigger signal of each sensor on the time axis.

In addition, when an event signal is input, the synchronization device may record the time point of receiving the event signal in the time stamp. For example, the event signal may be a switch signal input by a passenger riding in a vehicle equipped with the learning data collection device 200 when a specific event occurs, a signal generated when a specific object is detected by the LiDAR, a signal generated when a specific object is detected by the camera, and the like. In this way, the generated time stamp may generate learning data by selectively collecting data corresponding to an event signal suitable for the purpose of the learning data to be generated in the course of generating the learning data by the learning data generation device.

In addition, at step S140, the synchronization device may transmit the trigger signal including the time information recorded in the time stamp to each of a plurality of sensors.

Specifically, the synchronization device may transmit a reference signal to the LiDAR so that the LiDAR may control the rotation angle in accordance with the reference signal, and transmit a trigger signal to the camera so that the camera may control the shutter timing in accordance with the trigger signal.

At this point, the synchronization device may transmit the trigger signal generated for the camera to the camera when the time of the derived trigger timing elapses. Meanwhile, a method of deriving the trigger timing will be described below with reference to FIG. 6.

In addition, the synchronization device may transmit a trigger signal to a vehicle equipped with the LiDAR to synchronize time information of Controller Area Network (CAN) communication, which is a communication standard between devices installed in the vehicle, through the trigger signal.

Hereinafter, a method of deriving trigger timing according to an embodiment of the present invention will be described in detail.

Figure 6:
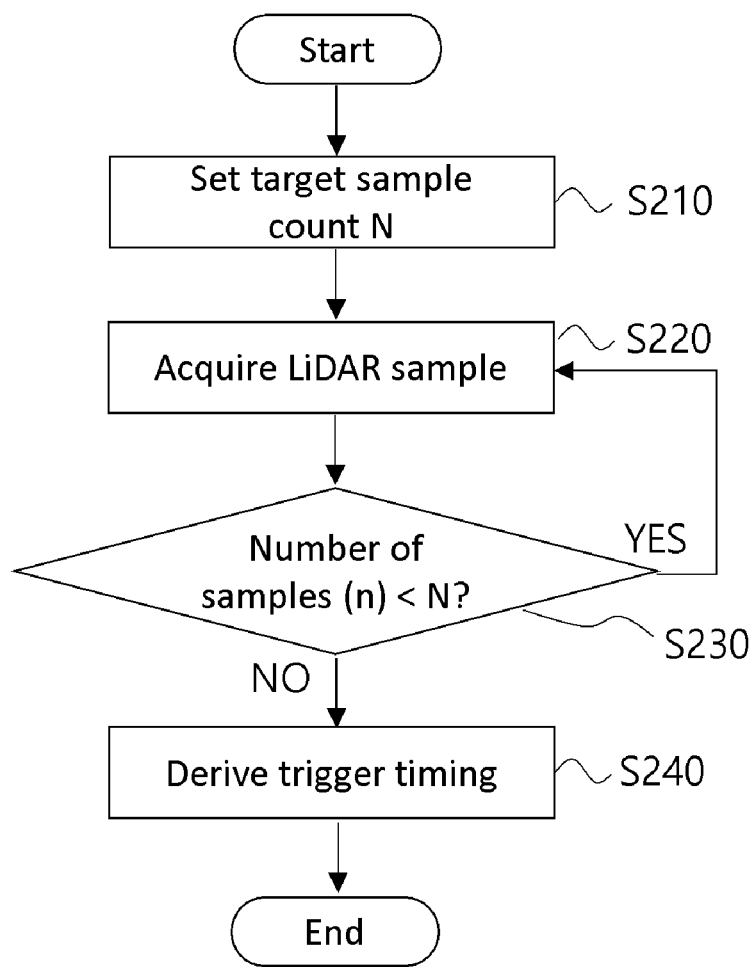
FIG. 6 is a flowchart illustrating a trigger timing derivation method according to an embodiment of the present invention.

FIG. 6 is a flowchart illustrating a trigger timing derivation method according to an embodiment of the present invention.

Referring to FIG. 6, at step S210, the synchronization device sets a target sample count N. Here, the target sample count N may be determined according to the specifications of the LiDAR 100.

Next, at step S220, the synchronization device acquires an output sample. At this point, when the sample is acquired, the synchronization device may increase the value of the acquired sample count indicating the number of previously acquired samples by 1, and derive an average value by dividing the total sum of a value of difference between the rotation angle included in the acquired sample and the rotation angle included in the previously acquired sample by the acquired sample count.

Next, at step S230, when the acquired sample count is smaller than the target sample count N, the synchronization device may repeat the step of acquiring samples (S220).

Then, at step S230, when the acquired sample count is not smaller than the target sample count N, the synchronization device derives trigger timing (S240). At this point, the synchronization device may derive a value obtained by dividing the average value by the output period $T_{reload}$ as an average angular velocity, acquire a gap angle, which is an angular difference between a point at which the LiDAR outputs a sample most recently and a trigger target, and derive a value obtained by dividing the gap angle by the average angular velocity as the trigger timing.

Figure 7:
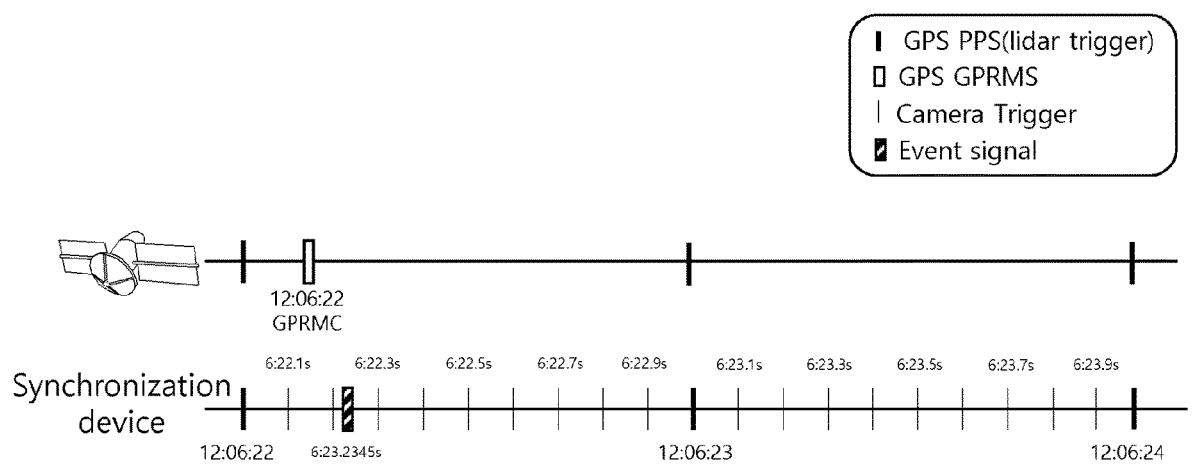
FIGS. 7 and 8 are exemplary views for explaining a synchronization method according to an embodiment of the present invention.
Figure 8:
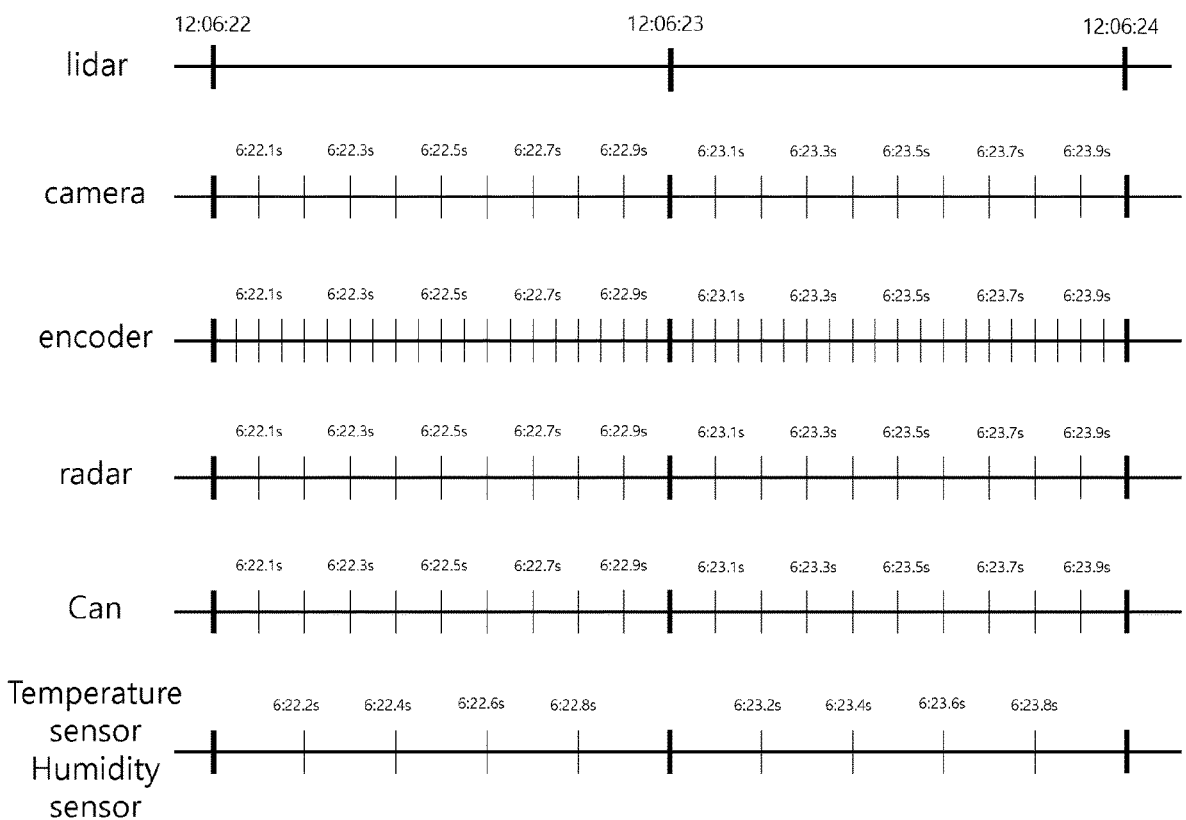

FIGS. 7 and 8 are exemplary views for explaining a synchronization method according to an embodiment of the present invention.

Meanwhile, in the following description, a method of synchronizing a LiDAR and a camera will be described as an example.

Referring to FIG. 7, the synchronization device may receive a GPS PPS signal and a GPS GPRMC signal from a GPS device. For example, time information included in the GPS GPRMC signal may be 12:06:22.

In addition, the synchronization device may generate a trigger signal on the basis of the received GPS PPS signal and GPS GPRMC signal. That is, when the GPS PPS signal and the GPS GPRMC signal are received from the GPS device, the synchronization device may generate a camera trigger signal of 10 Hz by dividing the GPS PPS signal into 10 segments.

In addition, the synchronization device may record a time stamp for the trigger signal generated on the basis of the GPS GPRMC signal. At this point, time information of the GPS PPS signal may be recorded on the basis of time information included in the nearest GPS GPRMC signal. Here, the time information for the pulse waveform of the trigger signal obtained by dividing the GPS PPS signal may be recorded on the basis of the GPS PPS signal recorded on the basis of the time information of the GPS GPRMC signal. For example, when it is assumed that the initially recorded GPS PPS signal is 12:06:22, the trigger signal divided into 10 segments may be recorded as 12:06:22.1 s, 12:06:22.2 s, . . . , 12:06:22.9 s.

In addition, the synchronization device may convert the GPS PPS signal into a trigger signal including time information and transmit it to the LiDAR so that the rotation angle may be controlled in accordance with the trigger signal. In addition, the synchronization device may transmit a trigger signal of 10 Hz including time information to the camera so that the camera may control the shutter timing according to the trigger signal. Accordingly, the LiDAR and the camera, as well as time information, can be synchronized.

Referring to FIG. 10, the synchronization device may generate a trigger signal for controlling various sensors, in addition to the signal for synchronizing the LiDAR and the camera.

For example, the synchronization device may generate a trigger signal of 1 Hz the same as the GPS PPS signal in the case of a LiDAR, a trigger signal of 10 Hz by dividing the GPS PPS signal into 10 segments in the case of a camera, a trigger signal of 20 Hz by dividing the GPS PPS signal into 20 segments in the case of an encoder, a trigger signal of 10 Hz by dividing the GPS PPS signal into 10 segments in the case of a radar, a trigger signal of 10 Hz by dividing the GPS PPS signal into 10 segments in the case of CAN communication of a vehicle, and a trigger signal of 5 Hz by dividing the GPS PPS signal into 5 segments in the case of a temperature sensor and a humidity sensor.

In addition, the synchronization device may record the generated trigger signal as a time stamp as shown in FIG. 8.

Figure 9:
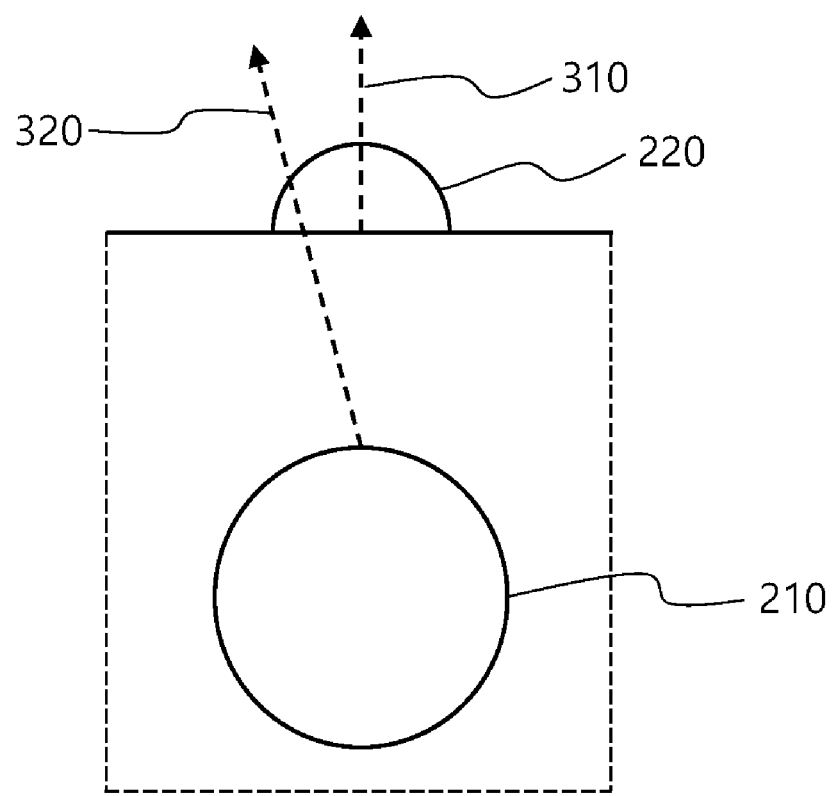
FIGS. 9 to 11 are exemplary views for explaining a trigger timing derivation method according to an embodiment of the present invention.
Figure 11:
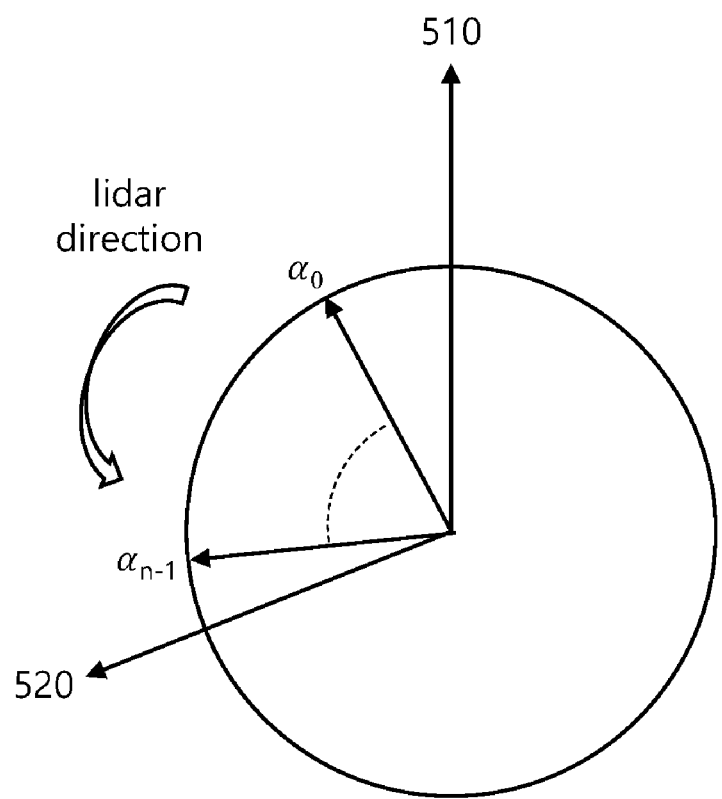

FIGS. 9 to 11 are exemplary views for explaining a trigger timing derivation method according to an embodiment of the present invention.

Specifically, FIG. 9 is view showing an example for comparing center lines of angles of view of the LiDAR 210 and the camera 220 according to an embodiment of the present invention.

Referring to FIG. 9, for convenience of explanation, it is assumed in the following description that the center line of the angle of view of the camera 220 is referred to as a first center line 310, and the center line of the angle of view of the LiDAR 210 is referred to as a second center line 320.

Here, the LiDAR 210 may output point cloud data while rotating, and the camera 220 may output image data. At this point, when the point cloud data and the image data output while the LiDAR 210 is facing the direction of the second center line 320 and the camera 220 is facing the direction of the first center line 310 are merged, an error may occur. For example, when the learning data generation device 400 attempts to identify an object from the merged image, the probability of identification failure may increase according to the discrepancy between the color information and distance information of the object.

To solve this problem, the synchronization device should merge the output data of the LiDAR 210 and the camera 220 when the first center line 310 is in line with the second center line 320. At this point, although the LiDAR 210 is set to rotate with a constant angular velocity, the angular velocity may have an error in a practical environment. Accordingly, when a photographing time point of the camera 220 is determined in advance by calculating the time point at which the center of the angle of view of the LiDAR 210 is in line with that of the camera 220 on the assumption that the angular velocity is constant, an error as shown in FIG. 9 may occur.

Meanwhile, FIG. 10 is an exemplary view for explaining a method of calculating trigger timing according to rotation of the LiDAR according to an embodiment of the present invention.

For convenience of explanation, in the present invention, the trigger target is defined as pointing a virtual direction in which the center of the angle of view of the LiDAR 210 is in line with that of the camera 220, and the trigger timing is defined as indicating an expected time of the LiDAR 210 to rotate from the current position to the trigger target. In addition, a signal indicating start of photographing transmitted to the camera 220 is defined as a trigger signal. In addition, FIG. 10 shows an example for explaining a method of synchronizing the LiDAR 210 and the camera 220 in a device configured of one camera. In a device configured of one camera, the LiDAR 210 repeatedly rotates between the same trigger target.

The LiDAR 210 may output a sample including point cloud data of a predetermined period. Here, the period is referred to as the output period $T_{reload}$. The sample may include a rotation angle indicating the current position of LiDAR 210. The rotation angle may indicate an angle that the LiDAR 210 rotates with respect to the trigger target 410.

The rotation angle included in the sample that the LiDAR 210 outputs in the first period while rotating using the trigger target 410 as the starting point is $a_0$, the rotation angle included in the sample output in the next period is $a_1$, and the rotation angle included in the sample output in the n-th period is $a_{n-1}$.

An average value may be derived by dividing the total sum of the difference of the rotation angle from a0 to $a_{n-1}$ by the number of samples n. An average angular velocity w may be derived by dividing the average value by the output period ($T_{reload}$) The equation for obtaining the average angular velocity ω is as shown below.

$$\omega = \frac{\sum_{k=0}^{n-1} \frac{a_{k+1} - a_k}{n}}{T_{reload}} \qquad \text{[Equation 1]}$$

A gap angle, which is an angular difference between $a_{n-1}$, which is the rotation angle included in the most recently output sample, and the trigger target 410, may be acquired. A value obtained by dividing the gap angle by the derived average angular velocity ω may be derived as the trigger timing. When the angle of the trigger target 410 is $a_{tr}$, the equation for calculating the trigger timing $T_{tr}$ is as shown below.

$$T_{tr} = \frac{a_{tr} - a_{n-1}}{\omega} \qquad \text{[Equation 2]}$$

That is, the time required to rotate and move from the point indicated by $a_{n-1}$ to the trigger target 410 may be derived as trigger timing.

When the time of the trigger timing elapses, the LiDAR 100 is expected to be positioned at the trigger target 410. At this point, when a trigger signal is transmitted to the camera 220 to capture an image, the output data of the LiDAR 210 and the image data of the camera 220 may be synchronized.

Meanwhile, FIG. 11 is an exemplary view for explaining a method of calculating trigger timing in a device for synchronizing a LiDAR and a camera including a plurality of cameras according to an embodiment of the present invention.

Referring to FIG. 11, the synchronization device may include a first camera and a second camera. The virtual direction in which the center of the angle of view of the LiDAR is in line with that of the first camera is a first trigger target 510, and the virtual direction in which the center of the angle of view of the LiDAR 100 is in line with that of the second camera is a second trigger target 520.

The first camera and the second camera may be disposed at regular intervals.

While rotating in the direction from the first trigger target 510 to the second trigger target 520, the LiDAR may output a sample at every output period $T_{reload}$. The sample may include a rotation angle indicating the current position of the LiDAR, and the rotation angle may indicate an angle that the LiDAR rotates with respect to the first trigger target 510.

When a sample is acquired, the synchronization device may increase the value of the acquired sample count, which indicates the number of previously acquired samples, by 1, derive an average value by dividing the total sum of a value of difference between the rotation angle included in the acquired sample and the rotation angle included in the previously acquired sample by the acquired sample count, derive a value obtained by dividing the average value by the output period $T_{reload}$ as an average angular velocity when the acquired sample count is equal to the target sample count N determined in advance, acquire a gap angle, which is an angular difference between the rotation angle included in the most recently output sample by the LiDAR and the second trigger target 520, and derive a value obtained by dividing the gap angle by the average angular velocity as the trigger timing.

As described above, although preferred embodiments of the present invention have been disclosed in the specification and drawings, it is apparent to those skilled in the art that other modified examples based on the technical spirit of the present invention can be implemented in addition to the embodiments disclosed herein. In addition, although specific terms are used in the specification and drawings, they are only used in a general sense to easily explain the technical contents of the present invention and help understanding of the present invention, and are not intended to limit the scope of the present invention. Accordingly, the detailed description described above should not be interpreted as limiting in all respects and should be interpreted illustrative. The scope of the present invention should be selected by reasonable interpretation of the appended claims, and all changes within the equivalent scope of the present invention are included in the scope of the present invention.

DESCRIPTION OF SYMBOLS

| | |
|---|---|
| 100: GPS device | 200: Learning data collection device |
| 300: Synchronization device | 400: Learning data generation device |
| 305: Communication unit | 310: Input/output unit |
| 315: Storage unit | 320: GPS signal receiving unit |
| 325: Trigger signal generation unit | |
| 330: Timestamp recording unit | |
| 335: Lidar sample acquisition unit | |
| 340: Trigger timing derivation unit | |
| 345: Trigger signal transmission unit | |

What is claimed is:

1. A multi-sensor synchronization method comprising the steps of:
   receiving, by a synchronization device, a reference signal for synchronizing a plurality of sensors from a Global Positioning System (GPS) device;
   generating, by the synchronization device, a trigger signal for each of the plurality of sensors based on the reference signal;
   recording, by the synchronization device, a time stamp for the trigger signal based on time information included in the reference signal;
   acquiring, by the synchronization device, a sample indicating a current position of a LiDAR of the plurality of sensors at every preset output period from the LiDAR;
   deriving, by the synchronization device, trigger timing, which is an expected time for the LiDAR to rotate from the current position to a trigger target, based on the sample; and
   transmitting, by the synchronization device, the trigger signal including the time information recorded in the time stamp to each of the plurality of sensors,
   wherein the step of deriving the trigger timing includes the steps of:
      deriving, by the synchronization device, an average value by dividing a total sum of a value of difference between a rotation angle indicating the current position of the LiDAR included in the acquired sample and a rotation angle included in a previously acquired sample by an accumulated number of acquired samples;
      repeating, by the synchronization device, the step of the acquiring the sample when the accumulated number of the acquired samples is smaller than a predetermined target number of samples; and
      deriving the trigger timing based on the average value when the accumulated number of the acquired samples is equal to the predetermined target number of samples.

2. The method according to claim 1, wherein the reference signal includes a GPS pulse per second (PPS) signal and a recommended minimum data for GPS (GPRMC) signal, and the step of generating the trigger signal includes generating the trigger signal corresponding to the each of the plurality of sensors by dividing the GPS PPS signal by a preset number of times according to types of the plurality of sensors, and the step of recording the time stamp includes recording the time stamp for the trigger signal based on time information included in the GPS GPRMC signal.

3. The method according to claim 2, wherein the step of receiving the reference signal includes generating, by the synchronization device, the PPS signal and the GPRMC signal based on local time in case the reference signal is not received.

4. The method according to claim 3, wherein the plurality of sensors includes the LiDAR, a camera, an encoder, a radar, a temperature sensor, or a humidity sensor.

5. The method according to claim 4, wherein the step of transmitting the trigger signal includes transmitting the reference signal to the LiDAR so that the LiDAR controls the rotation angle in accordance with the reference signal, and transmitting the trigger signal to the camera so that the camera controls shutter timing in accordance with the trigger signal.

6. The method according to claim 5, wherein the step of transmitting the trigger signal includes transmitting the trigger signal to the camera after a time indicated by the trigger timing elapses.

7. The method according to claim 6, wherein the sample includes the rotation angle indicating the current position of the LiDAR, the trigger target is a virtual direction in which a center of an angle of view of the LiDAR is in line with that of the camera, and the rotation angle is an angle that the LiDAR rotates with respect to the trigger target.

8. A non-transitory computer-readable storage medium storing a computer program, wherein the computer program includes a set of instructions, when executed by a processor, causes the processor to perform a multi-sensor synchronization method comprising the steps of:

receiving, by the processor, a reference signal for synchronizing a plurality of sensors from a Global Positioning System (GPS) device;
generating, by the processor, a trigger signal for each of the plurality of sensors based on the reference signal;
recording, by the processor, a time stamp for the trigger signal based on time information included in the reference signal;
acquiring, by the synchronization device, a sample indicating a current position of a LiDAR of the plurality of sensors at every preset output period from the LiDAR;
deriving, by the synchronization device, trigger timing, which is an expected time for the LiDAR to rotate from the current position to a trigger target, based on the sample; and
transmitting, by the processor, the trigger signal including the time information recorded in the time stamp to each of the plurality of sensors, wherein the step of deriving the trigger timing includes the steps of:
deriving, by the synchronization device, an average value by dividing a total sum of a value of difference between a rotation angle indicating the current position of the LiDAR included in the acquired sample and a rotation angle included in a previously acquired sample by an accumulated number of acquired samples;
repeating, by the synchronization device, the step of the acquiring the sample when the accumulated number of the acquired samples is smaller than a predetermined target number of samples; and
deriving the trigger timing based on the average value when the accumulated number of the acquired samples is equal to the predetermined target number of samples.

* * * * *